United States Patent
Yasuda et al.

(10) Patent No.: US 8,102,248 B2
(45) Date of Patent: Jan. 24, 2012

(54) BATTERY CHARGING SYSTEM FOR ELECTRIC VEHICLE

(75) Inventors: Toru Yasuda, Tokyo (JP); Tetsuo Nishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 496 days.

(21) Appl. No.: 12/412,768

(22) Filed: Mar. 27, 2009

(65) Prior Publication Data

US 2009/0251300 A1 Oct. 8, 2009

(30) Foreign Application Priority Data

Apr. 7, 2008 (JP) ................................. P2008-098952

(51) Int. Cl.
*B60R 25/10* (2006.01)
(52) U.S. Cl. ........ 340/426.1; 701/22; 320/104; 320/109
(58) Field of Classification Search ............... 340/426.1, 340/5.2, 538–538.17, 988–996; 705/412, 705/5; 320/109, 104, 107, 114, 108; 701/2, 701/22; 180/65.275
See application file for complete search history.

(56) References Cited

U.S. PATENT DOCUMENTS

| | | | | |
|---|---|---|---|---|
| 6,323,775 B1* | 11/2001 | Hansson | ..................... | 340/636.1 |
| 6,975,997 B1* | 12/2005 | Murakami et al. | ................ | 705/5 |
| 7,402,978 B2* | 7/2008 | Pryor | ............................. | 320/104 |
| 7,994,908 B2* | 8/2011 | Tonegawa et al. | ............ | 340/538 |
| 2002/0164979 A1* | 11/2002 | Mooney et al. | ................ | 455/417 |
| 2003/0209375 A1* | 11/2003 | Suzuki et al. | ................ | 180/65.3 |
| 2006/0130033 A1* | 6/2006 | Stoffels et al. | ................ | 717/166 |
| 2007/0147615 A1* | 6/2007 | Chou et al. | ..................... | 380/270 |
| 2009/0091291 A1* | 4/2009 | Woody et al. | ................. | 320/109 |
| 2009/0278492 A1* | 11/2009 | Shimizu et al. | ............... | 320/108 |
| 2010/0010698 A1* | 1/2010 | Iwashita et al. | ................. | 701/22 |

FOREIGN PATENT DOCUMENTS

| | | |
|---|---|---|
| CN | 1439544 A | 9/2003 |
| CN | 1606255 A | 4/2005 |
| JP | 2006262570 A | 9/2006 |

OTHER PUBLICATIONS

Chinese Office Action for CN200910133446.0 issued Mar. 31, 2011.

* cited by examiner

Primary Examiner — Hoi Lau

(57) ABSTRACT

A battery charging system includes: an electric vehicle; a network termination unit connectable to the electric vehicle through a power line cable for supplying electric power to the electric vehicle; and a first server that transmits a control signal indicative of permission or forbiddance of power supply from the network termination unit to the electric vehicle to the electric vehicle through the network termination unit. The electric vehicle transmits identification information for identifying the electric vehicle and the user thereof to the first server through the network termination unit. The network termination unit transmits position information concerning the position of the network termination unit to the first server. The first server determines permission or forbiddance of the power supply based on the identification information and the position information.

13 Claims, 2 Drawing Sheets

BATTERY CHARGING SYSTEM FOR ELECTRIC VEHICLE

Priority is claimed on Japanese Patent Application No. 2008-098952, filed Apr. 7, 2008, the content of which is incorporated herein by reference.

BACKGROUND OF THE INVENTION

1. Field of the Invention

The present invention relates to a battery charging system for an electric vehicle, which enables battery charge in an emergency without authentication and search for a stolen vehicle.

2. Description of the Related Art

Japanese Patent Unexamined Application, First Publication No. 2006-262570 discloses an example of a conventional battery charging system for electric vehicles. In the conventional battery charging system, a battery unit having a battery to supply electric power to an electric vehicle is connected to a charger for supplying electric power to the battery through a power cable. If the power cable of the battery unit is connected to the battery unit, a charge control unit included in the charger controls a power supplying unit to supply power to the battery unit and receives user information by PLC (power line communication) through the power cable for authentication. If the authentication succeeds, the charge control unit measures the amount of charged power and charges for the charged power. If the authentication fails, the control unit terminates the power supply by the power supplying unit.

However, a first problem of the conventional technology is in that a battery is not charged in an emergency if authentication fails. The reason is that the power supplying unit is controlled based only on success or failure of authentication.

A second problem is in that a stolen car cannot be searched if a battery thereof is successfully charged since the authentication result is used only for termination of power supply by the power supplying unit, measurement of charged power, and charge for the measured power.

SUMMARY OF THE INVENTION

The present invention has been made in consideration of the above problems. An object of the present invention is to provide a battery charging system by which a battery of an electric vehicle can be charged in an emergency regardless of a result of authentication. Another object of the present invention is to provide a battery charging system by which a stolen vehicle can be searched if the stolen vehicle tries to charge the battery thereof.

To solve the above problems, there is provided a battery charging system that includes: an electric vehicle; a network termination unit connectable to the electric vehicle through a power line cable for supplying electric power to the electric vehicle; and a first server that transmits a control signal indicative of permission or forbiddance of power supply from the network termination unit to the electric vehicle to the electric vehicle through the network termination unit. The electric vehicle transmits identification information for identifying the electric vehicle and a user thereof to the first server through the network termination unit. The network termination unit transmits position information concerning a position of the network termination unit to the first server. The first server determines permission or forbiddance of the power supply based on the identification information and the position information.

Accordingly, a user can charge battery in an emergency regardless of the authentication result. Further, a stolen vehicle can quickly be searched based on the identification information and the position information when the stolen vehicle tries to charge the battery thereof.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE INVENTION

The invention will now be described herein with reference to illustrative embodiments. Those skilled in the art will recognize that many alternative embodiments can be accomplished using the teachings of the present invention and that the invention is not limited to the embodiments illustrated herein for explanatory purposes.

Figure 1:
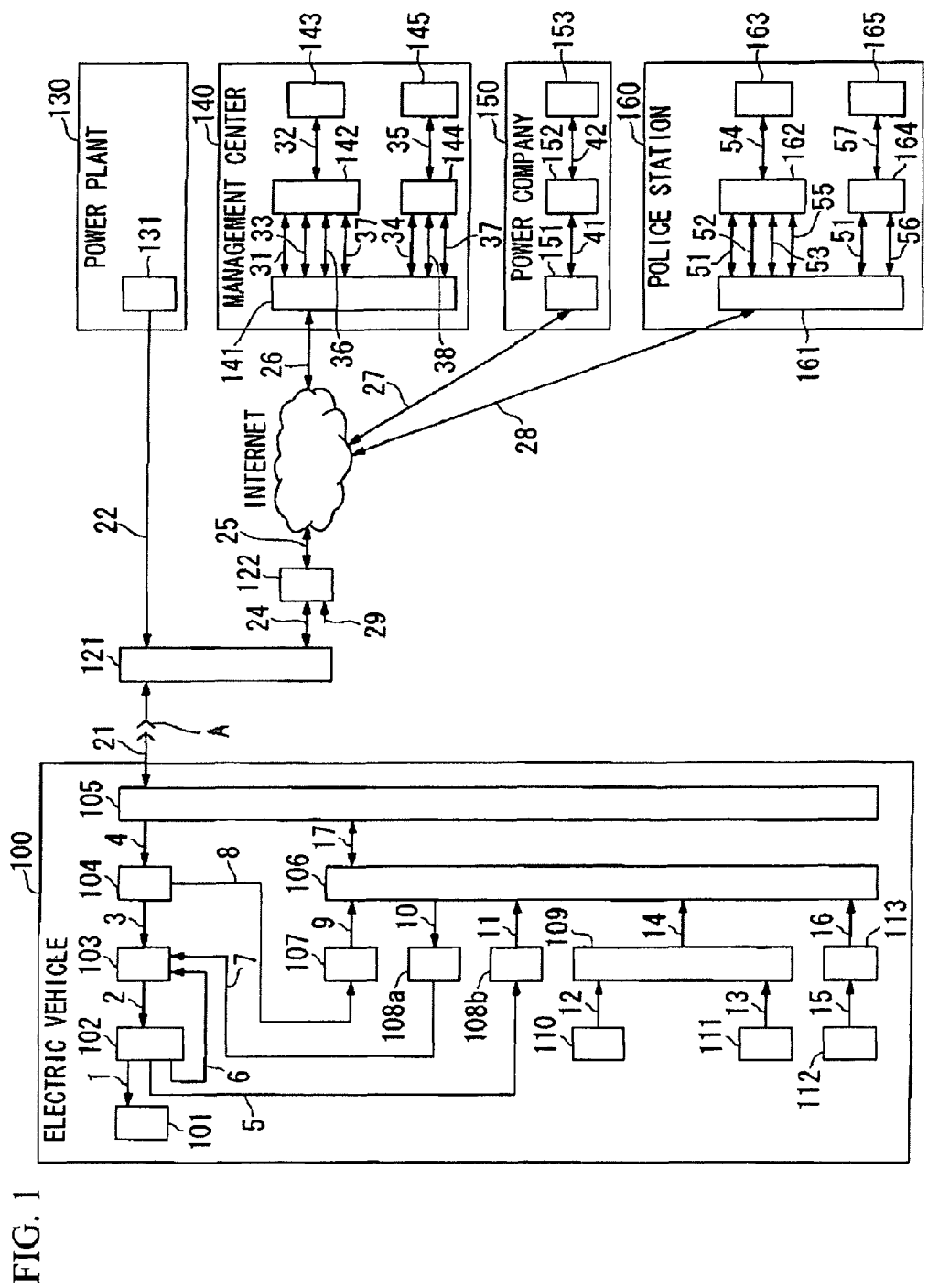
FIG. 1 is a block diagram illustrating a battery charging system according to an embodiment of the present invention.

As shown in FIG. 1, a battery charging system 200 according to an embodiment of the present invention includes: an electric vehicle 100; a PLC modem 121 into which the electric vehicle can be plugged through an outlet A and which transmits information through a power line; a network termination unit 122 (second network termination unit) that serves as a network termination and transmits information concerning the position of the network termination unit 122, i.e., a battery charge point; a power plant 130; a management center 140; a power company 150; and a police station 160.

The electric vehicle 100 includes: a battery 101 that can be charged multiple times; a battery charger 102; a controller 103 that controls power supply from the PLC modem 121 based on a control signal input to the controller 103; a power meter 104 that measures the amount of power to be charged; a PLC modem 105 that transmits information through a power line; a network termination unit (first termination unit) 106 that serves as a termination of a network, such as the Internet; a converter 107 that converts the amount of charged power into data that can be transmitted through the network; a converter 108a that converts a power control signal received through the network into data that can be input to the controller 103; a converter 108b that converts the amount of residual battery into data that can be transmitted through the network; an authentication unit 109 that performs user authentication and vehicle authentication based on, for example, an IC driver's license and the vehicle number, respectively; a card reader 110 that reads an ID card, such as an IC driver's license; a vehicle number reader 111 that reads the vehicle number; an emergency notification unit 112 that is, for example, an emergency button and indicates an emergency; and a converter 113 that converts information indicative of an emergency into data that can be transmitted through the network.

The power plant 130 includes a power generator 131 that generates electric power.

The management center 140 includes: a network termination unit 141 that serves as a termination of a network, such as the Internet; a server 142 that performs user authentication and vehicle authentication based on, for example, an IC driver's license and the vehicle number, respectively; a database 143 that stores registration information, such as IC driver's licenses and the vehicle numbers of users registered for the battery charging system; a server 144 that manages the amount of electric power charged to an electric vehicle of each user; and a database 145 that stores, for each user and each battery charge, information concerning the amount of charged power, the place and the date of buttery charge, and the like.

The power company 150 includes: a network termination unit 151 that serves as a termination of a network, such as the Internet; a server 152 that calculates and manages an electricity rate based on electric power used by receiving, from the server 144 of the management center 140, information concerning the amount of charged power, the place and the date of battery charge for each user and each battery charge, which is stored in the database 145, calculating the total electricity rate, and storing the calculated electricity rate; and a database 153 that stores, for each user, information concerning used electric power, electricity rate, and the like.

The police station 160 includes a network termination unit 161 that serves as a termination of a network, such as the Internet; a determining server 162 that determines whether or not it is an emergency based on conditions, such as a battery charge point specified by position information (for example, a battery charge point and a weather thereat), upon receiving a request for emergency battery charge, indicates permission or forbiddance of emergency battery charge to the management server 140; a database 163 that stores information concerning permission or forbiddance of emergency battery charge, the vehicle number, and the like; a server 164 that determines whether or not a vehicle to be charged is a stolen vehicle by checking the vehicle number of the vehicle to be charged against that of the stolen vehicle; and a database 165 that stores information concerning the vehicle numbers of stolen vehicles.

Hereinafter, the overall operations of the battery charging system are explained with reference to FIG. 1.

A user plugs an electric vehicle 100 into the outlet A provided at a battery charge station, a roadside utility pole, a parking lot of a convenience store, a friend's house, a user's house, or the like.

Then, the card reader 110 reads user ID data 12 from an ID card, such as an IC driver's license of the user. On the other hand, the vehicle number reader 111 reads vehicle ID data 13, such as the vehicle number. The user ID data 12 and the vehicle ID data 13 are input to the authentication unit 109.

Upon receiving the user ID data 12 and the vehicle ID data 13, the authentication unit 109 outputs an authentication protocol signal 14 to the network termination unit 106. The authentication protocol signal 14 is used for user authentication and vehicle number authentication, such as RADIUS authentication or IC card authentication using PKI (Public Key Infrastructure). The authentication protocol signal 14 includes the user authentication data 12, the vehicle authentication data 13, and information indicating whether authentication has succeeded or not.

If the user operates the emergency notification unit 112, such as an emergency button, in an emergency, the emergency notification unit 112 outputs an emergency signal 15 to the converter 113. Then, the converter 113 converts the emergency signal 15 into an emergency signal 16 that can be transmitted through the network, and outputs the emergency signal 16 to the network termination unit 106.

Then, the network termination unit 106 multiplexes the authentication protocol signal 14, the emergency signal 16, and a charged power signal 9, and outputs the multiplexed signal as network data 17 to the PLC modem 105. Then, the PLC modem 105 modulates the network data 17 into a PLC signal, and outputs the PLC signal as network data 21 to the PLC modem 121 through the outlet A.

The PLC modem 105 receives commercial power supplied through the power line and outputs commercial power 4 to the power meter 104. Then, the power meter 104 measures the amount of the input commercial power 4 and outputs commercial power 3 to the controller 103.

The PLC modem 121 is provided on, for example, a utility pole, and demodulates network data 21 to extract network data 24 to be output to the network termination unit 122. The PLC modem 121 is connected to the power generator 131 of the power plant 130 through a power line 22 and supplied commercial power therefrom.

The network termination unit 122 converts the received network data 24 into network data 25 that can be transmitted through the network. Similar to the PLC modem 121, the network termination unit 122 is provided on, for example, a utility pole, and multiplexes position information 29 indicative of a battery charge point to the network data 25. The position information 29 includes, for example, the unique number of a utility pole or an outlet, by which the detailed position of the network termination unit 122 can be specified. Since a vehicle moves and the position thereof cannot be fixed, fixed position information is useful.

Although it can be considered that information concerning a current position of a vehicle is calculated using, for example, GPS (Global Positioning System) and multiplexed to the network data 25, fixed position information is more useful and precise than the varying current position information. The position information 29 is used for tracking a stolen vehicle. By use of the position information 29, it can be determined in an emergency whether or not it is really an emergency based on conditions around a battery charge point, such as the weather or a disaster, thereby preventing abuse of emergency notice. Further, the battery charge point can be specified, which will be clues for identifying a power company that has supplied power and the battery charge point at the time of issuing electric bills.

The network termination unit 122 transmits the network data 25 with the position information 25 multiplexed through the network. Then, the network data 25 is received by the network termination unit 141 of the battery management center 140 as network data 26. The network termination unit 141 outputs authentication data 31 including the user authentication data 12 and the vehicle authentication data 13 to the server 142. Additionally, the network termination unit 141 outputs the charged power amount 34 to the server 144.

The server 142 performs authentication by checking the authentication data 31 against user identification data and vehicle identification data of users registered for the battery charging system, which are stored in the database 143. Then, the server 142 outputs a power control signal 33 indicative of the authentication result to the network termination unit 141. The power control signal 33 is used for permitting battery charge if authentication succeeds and forbidding battery charge if authentication fails. Then, a power control signal 33 is transmitted as network data 26 through the network, the network termination unit 122, the PLC modem 121, the outlet A, the PLC modem 105, and the network termination unit 106, and then input as the power control signal 10 to the converter 108a.

Then, the converter 108a converts the power control signal 10 into a power control signal 7, and outputs the power control signal 7 to the controller 103. If the power control signal 7 indicates permission of battery charge, the controller 103 receives the commercial power 3 and supplies commercial power 2 to the battery charger 102. If the power control signal 7 indicates forbiddance of battery charge, the controller 103 blocks the commercial power 3 and does not supply the commercial power 2 to the battery charger 102.

Upon receiving the commercial power 2, the battery charger 102 outputs charging power 1 to the battery 101 based on a charge protocol defined in the battery 101. When the battery 101 is completely charged, the battery charger 102 outputs a charge completion signal 6 to the controller 103. Upon receiving the charge completion signal 6, the controller 103 terminates the supply of the commercial power 2 to the battery charger 102.

Meanwhile, the battery charger 102 calculates the amount of residual battery before charging and outputs the calculated residual battery amount 5 to the converter 108b. Then, the converter 108b converts the residual battery amount 5 into a residual battery signal 11 that can be transmitted through the network, and outputs the residual battery signal 11 to the network termination unit 106. The network termination unit 106 multiplexes the residual battery signal 11, the authentication protocol signal 14, and the emergency notification signal 16, which is output as the network signal 17 to the PLC modem 105. Then, the network signal 17 is transmitted to the network termination unit 141 of the management center 140 through the PLC modem 105, the PLC modem 121, the network termination unit 122, and the network. Upon receiving the network signal 17, the network termination unit 141 outputs a residual battery amount 38 to the server 144. Thus, the server 144 stores the amount of residual battery for each user in the database 145 by outputting management data 35 to the database 145.

On the other hand, the power meter 104 measures the amount of charged power from the start of charging the battery 101 to the completion of the charging, and outputs charged power data 8 as the measurement result to the converter 107. The converter 107 converts the charged power data 8 into a charged power signal 9 that can be transmitted through the network, and outputs the charged power signal 9 to the network termination unit 106.

The network termination unit 106 multiplexes the charged power signal 9, the residual battery signal 11, the authentication protocol signal 14, and the emergency notification signal 16, and outputs the network signal 17 as the multiplexed signal. The network signal 17 is transmitted to the network termination unit 141 of the management center 140 through the PLC modem 105, the PLC modem 121, the network termination unit 122, and the network.

Upon receiving the network signal 17, the network termination unit 141 outputs the charged power data 34 to the server 144. Thus, the server 144 stores the amount of charged power for each user in the database 145 by outputting management data 35 to the database 145. Additionally, the server 144 outputs the management data 35 to the network termination unit 141. Then, the network termination unit 141 transmits management data 35 to the network termination unit 151 of the power company 150 through the network.

Upon receiving the management data 35 as network data 27, the network termination unit 151 outputs charged power data 41 to the server 152. The server 152 calculates an electricity rate of each user based on electricity rate data 42 received from the database 153 that stores, for each user, electricity rate data including, for example, user information, the amount of charged power, and an electricity rate. Then, the server 152 calculates the total electricity rate based on the electricity rate data 42 and the charged power data 41.

On the other hand, the network termination unit 106 multiplexes the authentication protocol signal 14, the emergency notification signal 16, and the charged power signal 9, and outputs the multiplexed signal as network data 17 to the PLC modem 105. The PLC modem 105 transmits the network data 17 to the network termination unit 161 of the police station 160 through the PLC modem 121, the network termination unit 122, and the network. Further, the network termination unit 122 transmits the position information 29 through the network to the network termination unit 161. Upon receiving the network data 17 and the position information 29 as the network data 28, the network termination unit 161 outputs authentication information 51, an emergency notification signal 52, and position information 53 to the server 162. Then, the server 162 determines whether it is an emergency or not based on weather information, such as the temperature or the weather, and accident or traffic conditions at the position indicated by the position information 53. Then, the server 162 stores emergency determination data 54 indicative of the emergency determination result, position information, the vehicle number, and the date of an emergency request in the database 163.

The server 162 outputs an emergency determination result 55 to the network termination unit 161. Then, the network termination unit 161 transmits the emergency determination result 55 to the network termination unit 141 of the charge management center 140. Upon receiving the emergency determination result 55 as the network data 26, the network termination unit 141 outputs the emergency determination result 36 to the server 142.

If the emergency determination result 36 indicates an emergency, the server 142 outputs the power control signal 33 indicative of permission of battery charge to the electric vehicle that has transmitted the emergency notification signal regardless of the authentication result.

On the other hand, the network termination unit 161 of the police station 160 outputs the authentication information 51 to the server 164. The server 164 checks the vehicle number included in the authentication information 51 against the stolen vehicle number 57 stored in the database 165. If the electric vehicle is determined to be a stolen vehicle, the server 164 outputs a stolen vehicle specification signal 56 to the network termination unit 161. Then, the network termination unit 161 transmits the stolen vehicle specification signal 56 to the network termination unit 141 of the management server 140 through the network. Upon receiving the stolen vehicle specification signal 56 as the network data 26, the network termination unit 141 outputs a stolen vehicle specification signal 37 to the server 142 and the server 144. The server 142 outputs the power control signal 33 indicative of forbiddance of battery charge regardless of the authentication result if the stolen vehicle specification signal 37 indicates that the electric vehicle is the stolen vehicle, so that the electric vehicle specified as the stolen vehicle cannot charge the battery.

Meanwhile, the server 144 reads the residual battery amount 38 of the electric vehicle specified as the stolen vehicle from the database 145, and outputs the residual battery amount 38 to the network termination unit 141. Then, the network termination unit 141 transmits information concerning the residual battery amount 38 to the network termination unit 161 of the police station 160 through the network.

Upon receiving the information concerning the residual battery amount 38, the network termination unit 161 outputs the received information to the server 164. The server 164 calculates an area within which the stolen car can run away based on the vehicle type of the stolen vehicle, the residual battery amount, and the position information, and reports the calculated area so that the police officers can quickly search for the stolen vehicle.

Figure 2:
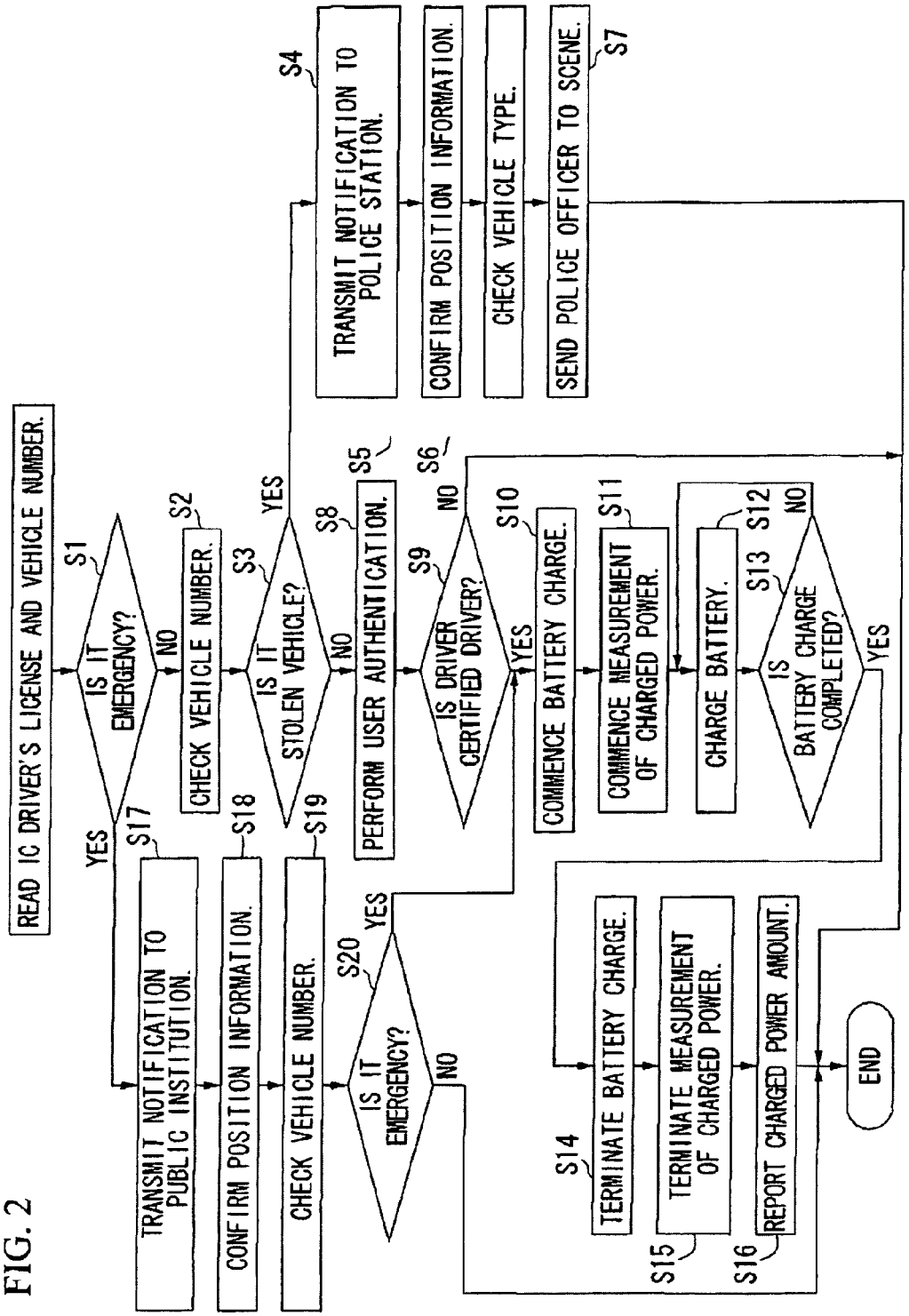
FIG. 2 is a flowchart illustrating operations of the battery charging system.

FIG. 2 is a flowchart of the overall operation of the battery charge system.

If the battery is running short while driving the vehicle, a user plugs an electric vehicle into an outlet provided at a battery charge station, a roadside utility pole, a parking lot of a convenience store, a friend's house, a user's house, or the like. Usually, a user charges the battery at a battery charge station before the battery runs out. However, a user has to use a public outlet provided on a roadside utility pole while driving in a remote area. In this case, the battery can be charged if user authentication and vehicle authentication succeed. User authentication and vehicle authentication are performed based on, for example, an IC driver's license and the vehicle number.

If it is not an emergency (step S1: NO), the card reader 110 reads an IC driver's license, and the vehicle number reader 111 reads the vehicle number to confirm the vehicle number (step S2). Then, it is determined whether or not the vehicle is a stolen vehicle (step S3). If the vehicle is a stolen vehicle (step S3:YES), battery charge is forbidden. Then, the residual battery amount, the battery charge point, and the vehicle type and color are confirmed, the current position and the runaway area are specified, and police officers are quickly sent to the scene for pursuing the stolen vehicle (steps S4 to S7). If the runaway area is very large since the residual battery amount is large, the next battery charge has to be waited for in some cases.

If the vehicle is not a stolen vehicle (step S3: NO), user authentication is performed based on, for example, an IC driver's license (step S8). Then, whether or not the electricity rate can be charged, i.e., whether or not the user is a certified user is determined (step S9). For example, users can be limited such that only users who have been preliminarily registered and paid a basic fee can utilize the battery charge system. If it is determined that the electricity rate can be charged, i.e., the user is a certified user (step S9: YES), battery charge is permitted and commenced (step S10). At the same time, measurement of the charged power amount is commenced (step S11). The battery is charged based on a battery charge protocol (step S12). If the battery charge is completed (step S13: YES), the battery charge and the measurement of the charged power amount are terminated (steps S14 and S15), and information concerning the charged power amount is transmitted to the management center 140 (step S16).

If it is an emergency (step S1: YES), an emergency notification is transmitted by a user operation to a public institution, such as a police station (step S17). For example, the following cases can be considered as an emergency. The battery is running short while driving in a remote mountain, in winter, and in a cold climate. There is no public battery charge station nearby, and therefore a public charge outlet has to be used. The user is not registered for a public battery charging system. The user has left the IC driver's license at home. The IC driver's license has expired. Such cases are life-threatening, and the user might be locked in the car. Therefore, it is unethical to forbid battery charge.

Then, it is determined at the public institution whether it is an emergency based on weather information, such as the temperature or the weather, accident information, and traffic conditions at the place from which the emergency notification is transmitted. Then, battery charge is permitted without authentication (steps S17 to S20). An electricity rate will be charged based on the vehicle number. Even when the vehicle is a stolen vehicle, battery charge is permitted to save a life.

According to the embodiment of the present invention, battery charge is enabled without authentication if it is determined to be an emergency. In other words, battery charge is enabled only by a user operating the emergency button to transmit an emergency notification signal if a vehicle of the user needs battery charge, but user authentication cannot be performed.

Additionally, battery charge is disabled and a battery charge point is specified if the vehicle number of a vehicle trying to charge the battery matches that of a stolen vehicle. Accordingly, the stolen vehicle can be quickly searched. Specifically, the vehicle number of an electric vehicle is checked against that of a stolen vehicle upon battery charge. Thereby, a stolen vehicle can be found out, the current position thereof can be specified, and therefore battery charge of the stolen vehicle can be disabled.

Further, a power company can charge for the total electric power used at home and for battery charge.

The present invention is applicable to a battery charge system for electric vehicles and search for stolen vehicles.

It is apparent that the present invention is not limited to the above embodiments, but may be modified and changed without departing from the scope and spirit of the invention.

What is claimed is:

1. A battery charging system, comprising:
   an electric vehicle;
   a network termination unit connectable to the electric vehicle through a power line cable for supplying electric power to the electric vehicle; and
   a first server that transmits a control signal indicative of permission or forbiddance of power supply from the network termination unit to the electric vehicle to the electric vehicle through the network termination unit, wherein
   the electric vehicle transmits identification information for identifying the electric vehicle and a user thereof to the first server through the network termination unit,
   the network termination unit transmits position information concerning a position of the network termination unit to the first server, and
   the first server determines permission or forbiddance of the power supply based on the identification information and the position information.

2. The battery charging system according to claim 1, wherein the identification information comprises a user identifier and the vehicle number.

3. The battery charging system according to claim 2, wherein
   the first server authenticates the electric vehicle and the user thereof based on the vehicle number and the user identifier, respectively.

4. The battery charging system according to claim 3, wherein
   the electric vehicle transmits an emergency signal to the first server in an emergency, and
   the first server determines whether or not it is an emergency based on the position information, and transmits a control signal indicative of permission of the power supply to the electric vehicle upon receiving the emergency signal and determining that it is an emergency, regardless of a result of user authentication.

5. The battery charging system according to claim 4, further comprising a second server, wherein:
   the electric vehicle transmits the identification information to the second server through the network termination unit;
   the second server determines whether or not the electric vehicle is a stolen vehicle based on the vehicle number, and transmits a determination signal indicative of a result of the determination to the first server; and the first server transmits a control signal indicative of forbiddance of the power supply to the electric vehicle if the determination signal indicates that the electric vehicle is a stolen vehicle.

6. The battery charging system according to claim 5, wherein:
   the electric vehicle transmits battery information concerning an amount of residual battery before charging to the first server;
   the first server stores the battery information and transmits the battery information to the second server when the determination signal indicates that the electric vehicle is a stolen vehicle;
   the network termination unit transmits the position information to the second server; and
   the second server calculates an area within which the electric vehicle can move from the network termination unit with the residual battery based on the battery information and the position information.

7. The battery charging system according to claim 5, wherein
   the first server transmits a control signal indicative of permission of the power supply when the determination signal indicates that the electric vehicle is not a stolen vehicle, and user authentication by the first server succeeds.

8. The battery charging system according to claim 2, further comprising a power company, wherein:
   the electric vehicle measures an amount of charged power and transmits charged power information concerning the amount of charged power to the first server through the network termination unit;
   the first server stores the charged power information with the identification information and the position information being correlated, and transmits user information including the charged power information, the identification information, and the position information to the power company; and
   the power company stores the user information and calculates an electricity rate based on the user information.

9. The battery charging system according to claim 5, wherein the second server determines whether or not the electric vehicle is a stolen vehicle by checking the vehicle number against that of the stolen vehicle preliminarily stored in the second server.

10. The battery charging system according to claim 4, wherein the electric vehicle multiplexes a signal indicative of the identification information to the emergency signal upon transmitting the emergency signal to the first server.

11. The battery charging system according to claim 6, wherein the electric vehicle multiplexes signals indicative of the identification information and the battery information to the emergency signal upon transmitting the emergency signal to the first server.

12. The battery charging system according to claim 4, wherein the first server determines whether or not it is an emergency based on environment information comprising a weather condition, a traffic condition, and a geographic condition at a position of the network termination unit indicated by the position information.

13. The battery charging system according to claim 3, wherein the user identifier is an IC driver's license.

* * * * *